United States Patent
Tanaka et al.

(10) Patent No.: US 6,305,847 B1
(45) Date of Patent: Oct. 23, 2001

(54) SLIDING BEARING

(75) Inventors: Takuya Tanaka; Nobutaka Hiramatsu; Akira Ono; Koichi Yamamoto; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/457,317

(22) Filed: Dec. 9, 1999

(30) Foreign Application Priority Data

Dec. 22, 1998 (JP) .................................................. 10-365184

(51) Int. Cl.⁷ ...................................................... F16C 33/20
(52) U.S. Cl. .......................... 384/297; 384/300; 384/907; 384/908
(58) Field of Search ..................................... 384/297, 298, 384/299, 300, 907, 907.1, 908, 909, 910

(56) References Cited

U.S. PATENT DOCUMENTS

| | | | |
|---|---|---|---|
| 2,695,425 | * 11/1954 | Stott | 384/297 X |
| 3,056,709 | * 10/1962 | Rising et al. | 384/300 X |
| 3,342,667 | * 9/1967 | Berlinghof, Jr. | 384/297 X |
| 3,843,527 | 10/1974 | Filippov | 508/121 |
| 4,048,370 | * 9/1977 | Orkin et al. | 384/300 X |
| 4,099,804 | * 7/1978 | Baker et al. | 384/297 |
| 4,123,122 | * 10/1978 | Gabrielson et al. | 384/300 |
| 4,847,135 | * 7/1989 | Braus et al. | 384/907 X |

FOREIGN PATENT DOCUMENTS

| | | |
|---|---|---|
| 892350 | 3/1962 | (GB) . |
| 1 356 174 | 6/1974 | (GB) . |
| 1 405 118 | 9/1975 | (GB) . |
| 2 130 306 | 5/1984 | (GB) . |
| 58-108299 | 6/1983 | (JP) . |
| 04-83914 | 3/1992 | (JP) . |
| 10-37962 | 2/1998 | (JP) . |

* cited by examiner

*Primary Examiner*—Thomas R. Hannon
(74) *Attorney, Agent, or Firm*—Browdy and Neimark

(57) ABSTRACT

In a sliding bearing in which a bearing metal layer is covered with a coating layer, the coating layer comprises a thermosetting resin as a base resin and soft metal particles dispersed in the base resin in an amount of 0.1 to 10% by volume based on the volume of the coating layer. The soft metal is harder than the base resin and has a higher thermal conductivity than the base resin, so that the wear resistance and anti-seizure property of the sliding bearing are improved. In particular, when the soft metal particles are of copper, silver, tin, zinc or the like, the soft metal particles react with the sulfur contained in a lubricating oil to form a thin metal sulfide film excellent in lubricity on the surface of the particles, whereby the coefficient of friction is made smaller.

16 Claims, No Drawings

SLIDING BEARING

BACKGROUND OF THE INVENTION

This invention relates to a sliding bearing, particularly to a sliding bearing in which a bearing metal layer is covered with a coating layer.

Sliding bearings in which a layer of a bearing metal such as copper alloy, aluminum alloy or the like is covered with a coating layer comprising a resin as the base are disclosed in, for example, JP-A 58(1983)-108,299. In this publication, the coating layer to be applied to the layer of a bearing metal such as aluminum alloy or the like is formed by incorporating a solid lubricant such as graphite, molybdenum disulfide or the like into a thermosetting resin such as a phenolic resin, an epoxy resin or the like, with the intention of improving the anti-seizure property of the coating layer.

Moreover, JP-A 4(1992)-83,914 discloses an improvement of the lubricity of the coating layer by adding a polyimide resin as a binding material to a solid lubricant such as molybdenum disulfide or the like. Furthermore, an example is shown in which hard particles such as chromium oxide particles, aluminum oxide particles or the like are added to improve the wear resistance.

In addition, JP-A 10(1998)-37,962 describes that the wear resistance is improved by allowing the: hard particles added to the resin and the solid lubricant having a spherical shape.

Recently owing to the high power and high revolution speed of internal combustion engine, the sliding bearings have become used under severer conditions, so that sliding bearings having a higher quality have been desired.

As shown in the above-mentioned conventional techniques, in the case of the coating layer in which a solid lubricant is added to a thermosetting resin used as the base resin, the coefficient of friction has been improved, but the wear resistance has rather become low. Further, in the case of the coating layer in which hard particles are added to the thermosetting resin, wear resistance has been improved, but anti-seizure property have become low. Thus, it has been impossible to make the coating layer excellent in all of coefficient of friction, wear resistance and anti-seizure property which are required for sliding bearings, so that sliding bearings in which a balance has been maintained among these properties have been prepared. Moreover, there has been a limit in improving these properties by only controlling the composition of the solid lubricant and the hard particles.

SUMMARY OF THE INVENTION

The present inventors have found that coefficient of friction, wear resistance and anti-seizure property can be more greatly improved by using a coating layer comprising a thermosetting resin added thereto soft metal particles and have accomplished this invention.

According to the first aspect of this invention, there is provided a sliding bearing in which a bearing metal layer is covered with a coating layer, wherein the coating layer comprises a thermosetting resin as a base resin and soft metal particles dispersed in the base resin in an amount of 0.1 to 10% by volume based on the volume of the coating layer.

DETAILED DESCRIPTION OF THE INVENTION

In the bearing metal layer, there can be used known bearing metals such as copper alloy, aluminum alloy and the like, and these can be appropriately selected depending upon purposes such as load carrying capacity, wear resistance and the like.

As the base resin in the coating layer, there are used thermosetting resins such as polyimide resins, epoxy resins, phenolic resins and the like because they have a great bonding force to the soft metals and can be cured by heating in the course of production of the bearing.

The polyimide resins include polyamide-imide, polyamino-bismaleimide, diiosyanate-denatured resins thereof, BPDA-denatured resins thereof, sulfone-denatured resins thereof and the like. In particular, desirable are those resins having high fatigue resistance such as polyamide-imide (referred to hereinafter as PAI), and the like. This PAI means a polymer having alternately amide bond and imide bond in the main chain, and includes denatured polyamide-imide resins, too.

The soft metal referred to herein means a soft metal which is harder than the base resin but has a hardness Hv of 60 or less. These soft metals are high in thermal conductivity and include not only pure metals, but also alloys. The wear resistance is improved by adding soft metal particles harder than the base resin and the anti-seizure property are improved by the high heatdissipation property. Specifically, the soft metal includes copper, silver, gold, aluminum, tin, zinc, indium and the like and alloys thereof. Hard metals, which have a hardness Hv exceeding 60, for example, molybdenum, nickel, iron and the like are not adequate because when these metals are used, the wear resistance is improved but the anti-seizure property is deteriorated and the attacking property against the counter member becomes high.

Moreover, it is preferable that the soft metal particles are of an easily sulfurizable metal such as copper, silver, tin, zinc or the like (referred to hereinafter as the second aspect of this invention). Among the soft metal particles, the easily sulfurizable metal particles are used, this metal reacts with sulfur contained in a lubricating oil to form a thin sulfide film excellent in lubricity on the surfaces of the particles, whereby the coefficient of friction is made smaller.

The soft metal particles are required to be dispersed in the coating layer which is in the form of a thin film and hence the diameters of the particles are preferably 5 $\mu$m or less, and particles having diameters of 0.05 to 3 $\mu$m are more preferable because they are easy to handle.

The amount of the soft metal particles added should be 0.1 to 10% by volume based on the volume of the coating layer. When the amount is less than 0.1% by volume, no sufficient addition effect is obtained. Moreover, when the amount exceeds 10% by volume, the forming of the coating layer becomes difficult. The amount is particularly preferably 0.5 to 5% by volume.

Furthermore, a solid lubricant can be contained in the coating layer in an amount of not more than 80% by volume based on the volume of the coating layer (referred to hereinafter as the third aspect of this invention). When the solid lubricant is contained, the coefficient of friction becomes smaller.

As the solid lubricant, there can be used at least one member selected from the group consisting of resins such as polytetrafluoroethylene (PTFE) and the like; graphite (Gr); and metal sulfides such as molybdenum disulfide ($MoS_2$), copper sulfide (CuS), tin sulfide (SnS) and the like. When the content thereof exceeds 80% by volume, the wear resistance is deteriorated.

The wear resistance can be improved by adding hard particles to the coating layer in an amount of not more than 5% by volume based on the volume of the coating layer (referred to hereinafter as the fourth aspect of this invention).

As the hard particles, there can be used at least one material having a high hardness, for example, oxides ($Al_2O_3$, $CoO-Al_2O_3$, etc.), nitrides (TiN, $Si_3N_4$, etc.), carbides (SiC, TiC, WC, etc.), fluorides ($CaF_2$, NaF, etc.), hard metals (Ni, Mo, Fe, etc.), and the like. When the amount exceeds 5% by volume, the anti-seizure property is deteriorated and attacking property against the counter member becomes high.

As these hard particles, there are used those having particle diameters of about 0.05 to 5 $\mu$m; however, the particles are desirably contained in the uniformly dispersion state in the coating layer which is in the form of a thin film, and it is preferable to use the particles in the form of fine particles having particle diameters of 0.1 to 3 $\mu$m.

Incidentally, the total content of the soft metal, the solid lubricant and the hard particles should preferably be not more than 90% by volume because when they are contained excessively, the coating layer becomes brittle and easy to peel.

The thickness of the coating layer having the above-mentioned composition is preferably about 2 to 30 $\mu$m. When the thickness is less than 2 $\mu$m, no sufficient initial conformability is obtained, and the endurance as to abrasion becomes insufficient. On the other hand, when the thickness exceeds 30 $\mu$m, the coating layer becomes easy to peel and with an increase of the thickness of the resin layer, the heat-dissipation properties are deteriorated. In view of a balance among them, the thickness is more preferably 3 to 20 $\mu$m.

In the case of the first aspect of this invention, a sliding bearing in which a bearing metal layer is covered with a coating layer can be allowed to have a small coefficient of friction, excellent wear resistance and anti-seizure property by using a thermosetting resin as the base resin of the coating layer and dispersing soft metal particles in the base resin in an amount of 0.1 to 10% by volume based on the volume of the coating layer.

In the case of the second aspect of this invention, the sliding bearing of the first aspect of this invention can be allowed to have a smaller coefficient of friction by using particles of an easily sulfurizable metal as the soft metal particles.

In the case of the third aspect of this invention, the sliding bearing of the first aspect or the second aspect of this invention can be allowed to have a much smaller coefficient of friction by containing not more than 80% by volume of a solid lubricant in the coating layer.

In the case of the fourth aspect of this invention, the wear resistance of the sliding bearing of the first, the second or third aspect of this invention can be further enhanced by containing not more than 5% by volume of hard particles in the coating layer.

DESCRIPTION OF PREFERRED EMBODIMENTS

Based on Examples of this invention and Comparative Examples, this invention is explained below in more detail.

A powder of a bearing metal was spread on a steel plate (SPES) which was used as a backing metal, sintered in a reducing atmosphere furnace, and thereafter rolled between rolls. This procedure was repeated twice to obtain a bimetal. The plate thickness of the bimetal obtained was such that the total plate thickness was 1.6 mm and the thickness of the bearing metal layer was 0.35 mm. The bimetal thus obtained was cut to a thrust washer having an outer diameter of 27.2 mm and an inner diameter of 22 mm to prepare a test piece.

As the bearing metal, a copper alloy (5% by weight of Pb, 11% by weight of Sn and balance of Cu) and an aluminum alloy (12% by weight of Sn, 3% by weight of Si and balance of Al) were tested. Incidentally, in Tables 1 and 2, Cu and Al stated in the "Bearing metal" column mean bearing metals having the above-mentioned alloy compositions, respectively.

These test pieces were subjected to pretreatment of degreasing and acid-washing and thereafter one of the following resin liquids was sprayed on the bearing metal surface.

As the base resin of the coating layer, PAI which is a thermosetting resin was selected. As PAI, there was used AI10 (a trade name of AMOCO CORPORATION). Moreover, in order to know the applicability of the other thermosetting resins, an epoxy resin (EP) was tested. As EP, there was used Chemitite CT430 (a trade name of Toshiba Chemical Co., Ltd.).

As the soft metal particles, there were selected particles of Ag, Cu, Sn and Al each having an average particle diameter of 0.3 $\mu$m.

As the solid lubricant, there were selected molybdenum disulfide ($MoS_2$), graphite (Gr), polytetrafluoroethylene (PTFE), copper sulfide (CuS) and tin sulfide (SnS).

As the hard particles, there were selected particles of silicon nitride ($Si_3N_4$), $Co-Al_2O_3$ which is a composite oxide and metallic nickel.

They were compounded so that the composition of the coating layer became as shown in Tables 1 and 2 to prepare a resin liquid dispersed in NMP (N-dimethyl-2-pyrrolidone), and this resin liquid was sprayed on the surface of a bearing metal, thereafter dried at 120° C. and then cured at 250° C. when the bearing metal was a Cu alloy or at 180° C. when the bearing metal was an Al alloy, whereby a coating layer having a thickness of approximately 20 $\mu$m was formed. The test pieces thus obtained in the Examples and the Comparative Examples were subjected to measurement of coefficient of friction and amount of wear and to seizure test.

The coefficient of friction and the amount of wear were measured by the Suzuki tester under the test conditions shown in Table 3 to obtain the results shown in Tables 1 and 2, and the seizure test was conducted by the Suzuki tester under the test conditions shown in Table 4 to obtain the results shown in Tables 1 and 2.

TABLE 1

| | Composition of bearing | | | | | | | | | | Test result | | |
|---|---|---|---|---|---|---|---|---|---|---|---|---|---|
| | | Coating layer (vol %) | | | | | | | | | | | Specific load of |
| | | Base resin | | Soft metal particle | | | | Solid lubricant | | Hard particle | Coefficient of friction | Amount wear ($\mu$m) | seizure occurrence (MPa) |
| | Bearing metal | PAI | EP | Ag | Cu | Sn | Al | MoS$_2$ | PTFE | Ni | | | |
| Example | | | | | | | | | | | | | |
| 1 | Cu | 99.5 | | | 0.5 | | | | | | 0.09 | 7 | 18 |
| 2 | Cu | 99 | | | 1 | | | | | | 0.09 | 6 | 18 |
| 3 | Cu | 95 | | | 5 | | | | | | 0.08 | 4 | 21 |
| 4 | Cu | 91 | | | 9 | | | | | | 0.08 | 3 | 24 |
| 5 | Cu | 99 | | 1 | | | | | | | 0.09 | 5 | 18 |
| 6 | Cu | 95 | | 5 | | | | | | | 0.08 | 4 | 21 |
| 7 | Cu | 95 | | | | 5 | | | | | 0.09 | 5 | 21 |
| 8 | Cu | | 99 | | 1 | | | | | | 0.09 | 8 | 18 |
| 9 | Cu | | 95 | | 5 | | | | | | 0.09 | 7 | 18 |
| 10 | Al | 99 | | | 1 | | | | | | 0.09 | 6 | 18 |
| 11 | Cu | 99 | | | | | 1 | | | | 0.10 | 6 | 18 |
| 12 | Cu | 95 | | | | | | 5 | | | 0.11 | 5 | 18 |
| 13 | Cu | 91 | | | | | | 9 | | | 0.12 | 4 | 18 |
| Comparative Example | | | | | | | | | | | | | |
| 1 | Cu | | | | | | | | | | 0.14 | 3 | 9 |
| 2 | Al | | | | | | | | | | 0.13 | 4 | 12 |
| 3 | Cu | 100 | | | | | | | | | 0.10 | 12 | 15 |
| 4 | Cu | | 100 | | | | | | | | 0.10 | 13 | 15 |
| 5 | Cu | 95 | | | | | | 5 | | | 0.07 | 15 | 18 |
| 6 | Cu | 60 | | | | | | 40 | | | 0.05 | 17 | 21 |
| 7 | Cu | 30 | | | | | | 70 | | | 0.03 | 20 | 24 |
| 8 | Cu | 95 | | | | | | | | 5 | 0.12 | 8 | 12 |
| 9 | Cu | 15 | | | | | | | 80 | 5 | 0.02 | 15 | 21 |

TABLE 2

| | Composition of bearing | | | | | | | | | | | Test result | | |
|---|---|---|---|---|---|---|---|---|---|---|---|---|---|---|
| | | | Coating layer (vol %) | | | | | | | | | | | Specific load |
| | | Base resin | Soft metal particle | | Solid lubricant | | | | | Hard particle | | Coefficient of friction | Amount of wear ($\mu$m) | of seizure occurrence (MPa) |
| Example | Bearing metal | PAI | Ag | Cu | MoS$_2$ | Gr | PTFE | CuS | SnS | Si$_3$N$_4$ | Oxide | | | |
| 14 | Cu | 92 | 3 | 5 | | | | | | | | 0.06 | 5 | 21 |
| 15 | Cu | 57 | | 3 | 40 | | | | | | | 0.05 | 6 | 24 |
| 16 | Cu | 27 | | 3 | 70 | | | | | | | 0.03 | 7 | 27 |
| 17 | Cu | 39 | | 1 | 60 | | | | | | | 0.04 | 9 | 24 |
| 18 | Cu | 35 | | 5 | 60 | | | | | | | 0.05 | 7 | 27 |
| 19 | Cu | 57 | | 3 | | 40 | | | | | | 0.05 | 6 | 24 |
| 20 | Cu | 39 | | 1 | 40 | | 20 | | | | | 0.04 | 7 | 27 |
| 21 | Cu | 56 | 3 | | 40 | | | 1 | | | | 0.03 | 7 | 27 |
| 22 | Cu | 52 | 3 | | 40 | | | | 5 | | | 0.02 | 6 | 30 |
| 23 | Cu | 54 | 3 | | 40 | | | | | 3 | | 0.02 | 7 | 30 |
| 24 | Cu | 52 | | 3 | 40 | | | | | 5 | | 0.04 | 1 | 24 |
| 25 | Cu | 54 | | 3 | 40 | | | | | | 3 | 0.04 | 2 | 24 |
| 26 | Cu | 31 | | 3 | 40 | 20 | | 3 | | 3 | | 0.02 | 1 | 33 |
| 27 | Al | 57 | | 3 | 40 | | | | | | | 0.05 | 6 | 24 |
| 28 | Al | 54 | 3 | | 40 | | | | | 3 | | 0.03 | 5 | 27 |
| 29 | Al | 31 | | 3 | 40 | 20 | | 3 | | 3 | | 0.02 | 2 | 33 |

TABLE 3

|  | Test conditions | Unit |
| --- | --- | --- |
| Sample size | Outer dia. 27.2 × inner dia. 22 × thickness 1.6 | mm |
| Peripheral speed | 0.5 | m/s |
| Specific load | 10 (Constant) | MPa |
| Test Time | 4 | Hr |
| Lubricating oil | SAE#30 | — |
| Lubricating oil temp. | Room temperature | — |
| Lubricating method | Oil bath | — |
| Shaft Material | S55C | — |
| Roughness | 0.3 or less | Rmax μm |
| Hardness | 500~700 | Hv10 |

TABLE 4

|  | Test conditions | Unit |
| --- | --- | --- |
| Sample size | Outer dia. 27.2 × inner dia. 22 × thickness 1.6 | mm |
| Peripheral speed | 2 | m/s |
| Specific load | 3 MPa was accumulated every 30 minutes. | — |
| Lubricating oil | SAE#30 | — |
| Lubricating oil temp. | 60 | °C. |
| Lubricating method | Dropping of oil | — |
| Shaft Material | S55C | — |
| Roughness | 1.0 | Rmax μm |
| Hardness | 500~700 | Hv10 |

From the test results of coefficient of friction, amount of wear and specific load of seizure occurrence shown in Table 1, the following were made clear:

When Comparative Examples 1 and 2 in which the bearing metal was not covered with the coating layer and hence was exposed are compared with Comparative Examples 3 and 4 in which coating layers of PAI and EP were formed, respectively, it can be seen that the specific load of seizure occurrence was larger in the latter than in the former, while the amount of wear was larger in the latter than in the former.

Moreover, in Comparative Examples 5 to 7 in which molybdenum disulfide which is a solid lubricant was added to the coating layer, the coefficient of friction was lowered and the specific load of seizure occurrence was increased with an increase of the amount of molybdenum disulfide added, while the amount of wear was increased.

Furthermore, in Comparative Example 8 in which nickel particles which are hard particles were added alone in an amount of 5% by volume to the coating layer, the amount of wear was smaller than in Comparative Example 3, but the specific load of seizure occurrence was smaller than in Comparative Example 3.

On the other hand, in Examples 1 to 4 in which copper particles which are soft metal particles were added in amounts of 0.5%, 1%, 5% and 9% by volume, respectively, to the coating layer, the coefficient of friction and amount of wear were lowered and the specific load of seizure occurrence was increased with an increase of the amount of copper particles added. In particular, in Example 4 in which the copper particles were added in an amount of 9% by volume, such excellent values were shown that the coefficient of friction was 0.08, the amount of wear was 3 μm and the specific load of seizure occurrence was 24 MPa. Incidentally, even in Example 10 in which aluminum alloy was used as the bearing metal, the values of coefficient of friction, amount of wear and specific load of seizure occurrence obtained were the same as those in Example 2 in which copper alloy was used as the bearing metal.

In addition, even in Examples 5 to 7 in which silver particles and tin particles were added, respectively, as the soft metal particles, the coefficient of friction and amount of wear were lowered and the specific load of seizure occurrence was increased.

Incidentally, in Examples 11 to 13 in which aluminum particles were added as the soft metal particles, the coefficient of friction and amount of wear were lowered and the specific load of seizure occurrence was increased. The reason therefor is considered to be that since soft metals such as aluminum, copper, silver and the like are harder than the resin, the wear resistance is improved and since the soft metals are good in heatdissipation because of their high thermal conductivity, the specific load of seizure occurrence becomes large.

Examples 14 to 29 shown in Table 2 are Examples in which soft metal particles were added and solid lubricant and hard particles were further added, and in all the cases, an improvement effect was obtained by the addition of each of them. In particular, Examples 26 and 29 are Examples of a coating layer composed of 3% by volume of Cu, 40% by volume of molybdenum disulfide, 20% by volume of graphite, 3% by volume of copper sulfide and 3% by volume of silicon nitride, and were best in all of coefficient of friction, amount of wear and specific load of seizure occurrence.

What is claimed is:

1. A sliding bearing in which a bearing metal layer is covered with a coating layer,
   the bearing metal layer being a bearing metal alloy layer with a backing metal,
   the bearing metal alloy being selected from the group consisting of a copper alloy and an aluminum alloy,
   wherein the coating layer has a thickness in the range 2 to 30 μm,
   the coating layer comprises a thermoset polyimide resin as a base resin, and
   soft metal particles are dispersed in said thermoset polyimide resin in an amount of 0.1 to 10% by volume based on the volume of the coating layer,
   the soft metal particles being selected from the group consisting of copper, silver, gold, aluminum, tin, zinc, indium and alloys thereof.

2. The sliding bearing of claim 1 wherein said polyimide is a polyamide-imide resin.

3. The sliding bearing according to claim 1, wherein hard particles are contained in the coating layer in an amount of not more than 5% by volume based on the volume of the coating layer.

4. The sliding bearing of claim 3 wherein said polyimide is a polyamide-imide resin.

5. The sliding bearing according to claim 1, wherein a solid lubricant is contained in the coating layer in an amount of not more than 80% by volume based on the volume of the coating layer, said solid lubricant being selected from polytetrafluoroethylene(PTFE), graphite and metal sulfides.

6. The sliding bearing of claim 5 wherein said polyimide is a polyamide-imide resin.

7. The sliding bearing according to claim 5, wherein hard particles are contained in the coating layer in an amount of not more than 5% by volume based on the volume of the coating layer.

8. The sliding bearing of claim 7 wherein said polyimide is a polyamide-imide resin.

9. The sliding bearing according to claim 1, wherein the soft metal particles are of an easily sulfurizable metal selected from the group consisting of copper, silver, tin, zinc and alloys thereof.

10. The sliding bearing of claim 9, wherein said polyimide is a polyamide-imide resin.

11. The sliding bearing according to claim 9, wherein hard particles are contained in the coating layer in an amount of not more than 5% by volume based an the volume of the coating layer.

12. The sliding bearing of claim 11 wherein said polyimide is a polyamide-imide resin.

13. The sliding bearing according to claim 9, wherein a solid lubricant is contained in the coating layer in an amount of not more than 80% by volume based on the volume of the coating layer, said solid lubricant being selected from polytetrafluoroethylene(PTFE), graphite and metal sulfides.

14. The sliding bearing of claim 13 wherein said polyimide is a polyamide-imide resin.

15. The sliding bearing according to claim 13, wherein hard particles are contained in the coating layer in an amount of not more than 5% by volume based on the volume of the coating layer.

16. The sliding bearing of claim 15 wherein said polyimide is a polyamide-imide resin.

* * * * *